United States Patent [19]

Tsai

[11] Patent Number: 5,558,798

[45] Date of Patent: Sep. 24, 1996

[54] MICROWAVE STEAM COOKING APPARATUS

[76] Inventor: Daniel T. Tsai, 7033 Burnside Dr., San Jose, Calif. 95120

[21] Appl. No.: 489,483

[22] Filed: Jun. 12, 1995

[51] Int. Cl.⁶ ................................................ H05B 6/80
[52] U.S. Cl. .................. 219/731; 219/729; 219/730; 219/734; 99/DIG. 14
[58] Field of Search .................... 219/731, 729, 219/730, 734, 735; 99/DIG. 14, 417, 451

[56] References Cited

U.S. PATENT DOCUMENTS

| | | | |
|---|---|---|---|
| 3,941,967 | 3/1976 | Sumi et al. | 219/10.55 E |
| 4,398,077 | 8/1983 | Freedman et al. | 219/729 |
| 4,413,167 | 11/1983 | Martel et al. | 219/731 |
| 4,477,705 | 10/1984 | Danley et al. | 219/10.55 E |
| 4,481,392 | 11/1984 | Nibbe et al. | 219/731 |
| 4,490,597 | 12/1984 | Mengel | 219/735 |
| 4,853,509 | 8/1989 | Murakami | 219/731 |
| 4,923,704 | 5/1990 | Levinson | 426/243 |
| 5,310,981 | 5/1994 | Sarnoff et al. | 219/731 |
| 5,313,878 | 5/1994 | Strait | 99/475 |
| 5,370,042 | 12/1994 | Tolchin et al. | 99/451 |

*Primary Examiner*—Philip H. Leung
*Attorney, Agent, or Firm*—Robert Samuel Smith

[57] ABSTRACT

A microwave cooking apparatus having a steam generating chamber constructed to receive microwaves and a cooking chamber constructed to be shielded from microwaves but which communicates with the steam generating chamber so that the food is cooked by exposure to steam heat rather than microwaves. Alternatively, microwave transmitting areas in the shield of the cooking chamber permit partial transmission of the microwaves so that the food is cooked by a combination of steam and microwave heat.

22 Claims, 5 Drawing Sheets

MICROWAVE STEAM COOKING APPARATUS

FIELD OF THE INVENTION

The present invention relates to microwave cooking apparatus and particularly to heating and cooking foods by steam or the combination of steam and microwave.

PRIOR ART AND INFORMATION DISCLOSURE

Typically foods which may be frozen or at ambient temperature are heated or cooked by microwave in a container made of electrically insulating material. Under this condition, heating, defrosting or cooking of food is generally irregular or uneven and results in "hot spots" or different degrees of "doneness". In addition, heat is generated internally inside the food and the moisture inside the food evaporates and escapes. This causes lumpiness and dryness, especially after the food cools down to ambient temperature. This phenomenon is especially pronounced in steamed wheat or rice dishes. These drawbacks are generally minimized by cooking in steam. It would therefore be desirable to combine the advantages of cooking with steam to eliminate these problems associated with the loss of moisture and particularly the uneven loss of moisture and the advantages of cooking using microwave energy to obtain the advantages of quick and complete heating of the foodstuff.

Disclosures have appeared with the object of improving the uniformity of distribution of heat in cooking with microwave.

For example, U.S. Pat. No. 3,9411,967 to Sumi et al discloses a microwave cooking container constructed such that the outer surface of the food is seared and taste is improved thereby. The container includes a heating element which is heated by absorbing radiated microwave energy. The food is heated by placing the food on the heating element where the food absorbs energy directly from the radiating source and from the heating element. This device is not intended to provide even heating.

U.S. Pat. No. 4,477,705 to Danley et al discloses a microwave cooker for popping corn having a pyramidal-shaped lower heating chamber to pop corn, generate steam for cooking food supported at an upper level or to contain grease. However the pyramidal shaped chamber is not an efficient generator of steam nor is it designed for most efficient steam distribution.

U.S. Pat. No. 4,923,704 to Levinson discloses an arrangement for combination microwave and steam heating in which food is placed on a perforated microwave absorbing tray and exposed to microwave radiation through a transmissive cover so that the food is cooked not only by direct exposure to the microwaves but is also heated by direct contact with the microwave absorbing tray. Steam from a lower chamber is applied to the food through perforations in the microwave absorbing tray.

U.S. Pat. No. 5,313,878 to Strait discloses a microwave cooking system including a mister which sprays preheated water into the cooking chamber. The food is cooked by microwave radiation independent of the injection of steam mist into the cooking chamber.

OBJECTS

It is therefore an object of this invention to provide a novel, inexpensive and convenient microwave steam cooking apparatus to overcome shortcomings of the prior art in microwave cooking containers and to apply microwave oven cooking to new uses.

It is another object to provide a microwave steam cooking apparatus which, when used with microwave, is capable of cooking food with steam without exposing the food directly to microwave radiation.

It is another object to provide a cooking apparatus used with microwave which is capable of cooking food with steam and controlled microwave energy to hasten the cooking process while enveloping the the food in a high humidity cooking environment to eliminate dryness and hard lumps in the cooked food.

It is yet another object to cook food with steam or a combination of steam and microwave energy under pressure.

SUMMARY

This invention is directed toward a a microwave heated vessel including an upper steam generating chamber supported by a lower food containing chamber and constructed such that the food is shielded from microwave radiation. The upper chamber is separated from the lower chamber by a water tray with vent openings to allow steam to enter the lower food containing chamber. The upper steam generating chamber is constructed to allow microwave energy to reach water contained in the water tray and to contain steam inside the cooking utensil. A base container forming the food containing chamber and the water tray over the base container are both constructed of microwave shielding material which prevents microwave radiation from warming the food directly so that the food is cooked by the steam only.

In the context of this specification it is useful to distinguish between:

1./ microwave absorbing material which is material having a large electrical conductivity and low permeability and therefore becomes heated by generation of eddy currents;

2./ microwave shielding material which has small electrical conductivity and large magnetic permeability and reflects microwaves;

3./ microwave transmitting material which has a small electrical conductivity and a small magnetic permeability and is transparent to microwaves.

In the context of this specification, the term, "microwave shielding material" is taken to include some metal alloys and ferrites. For example, iron alloyed with silicon in an amount of a few percent has a resistivity greater than 80 microohms/cm and a permeability of greater than 1000 $U_o$ and is considered to be a microwave shielding material ($U_o$ is the permeability of free space.) Ferrites have a permeability greater than 250 $U_O$ and resistivity greater than $10^3$ ohms/cm and are considered to be microwave shielding material in the context of this specification.

In the context of this specification, the term, "microwave transmitting material" is taken to include common glasses, ceramics and plastics having a resistivity greater than $10^3$ ohms/cm and a permeability of less than $5 \times U_o$.

In another embodiment of the invention, the water tray and base container comprise microwave shielding layer laminated to a microwave transmitting material and the microwave shielding layer has a "window" which permits entry of some microwave radiation into the food containing chamber so that the food is cooked by a controlled combination of steam and microwave energy.

DESCRIPTION OF PREFERRED EMBODIMENTS

Figure 1:
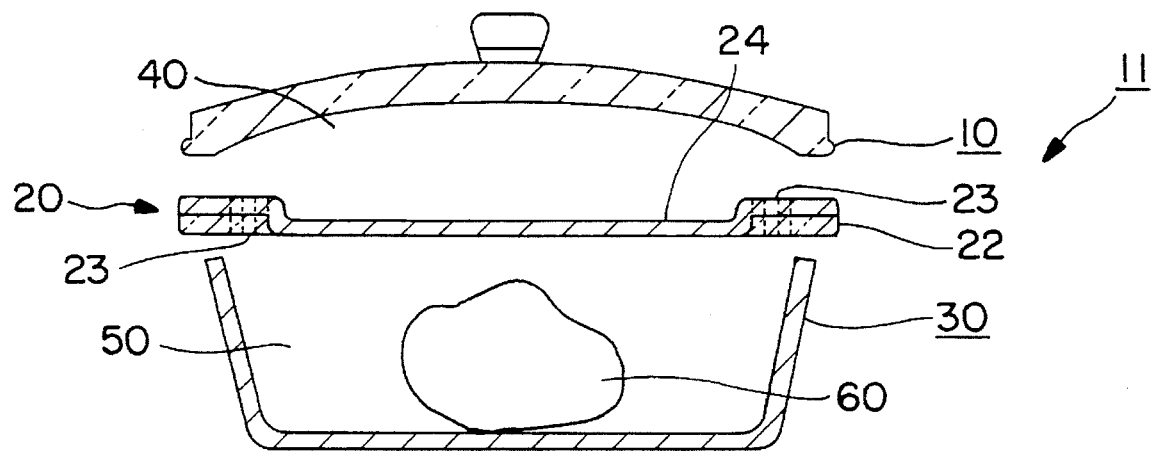
FIG. 1 is a sectional view of one embodiment of the invention.

Turning now to a discussion of the drawings, FIG. 1 is a sectional view showing a vessel 11 of this invention for cooking food by steam generated by microwave in which the food 60 is shielded from the microwave. The apparatus includes a top cover 10 and a base container 30.

Figure 2:
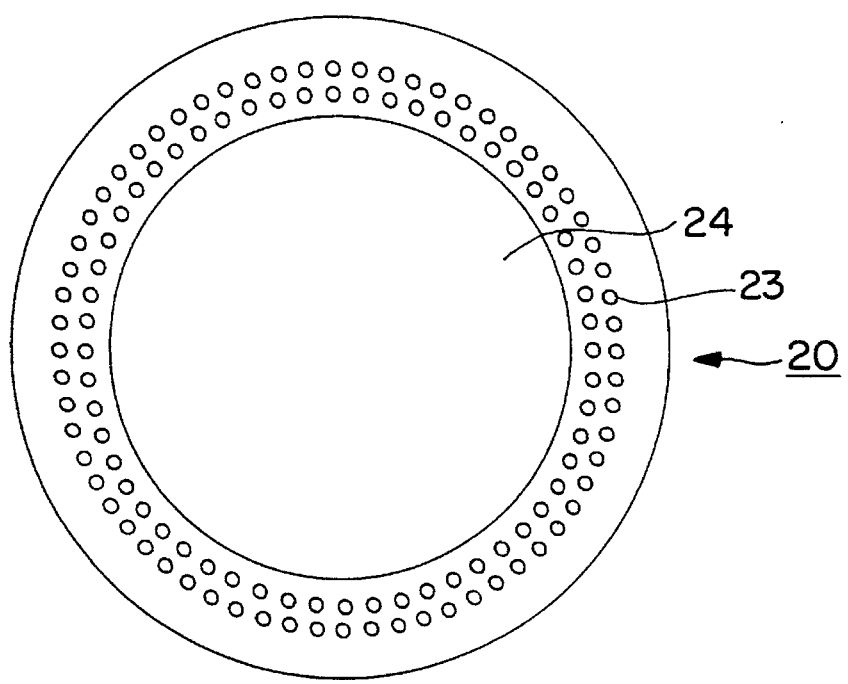
FIG. 2 is a plan view of the water tray shown in FIG. 1.

A water tray 20 is placed between the top cover 10 and the base container 30 thereby separating the apparatus into two chambers, the steam generating chamber 40 and the food containing (or cooking) chamber 50. The cover 10 is composed of microwave transmitting material and thereby allows the microwaves to reach the water tray 20 from which the steam is generated within the cooking apparatus. The water tray 20, as shown in the top (plan) view of FIG. 2, has a water reservoir 24 and vent openings 23 to allow steam to enter from the steam generating chamber 40 into the food containing chamber 50. The water tray 20 is constructed of microwave shielding material to block microwaves from reaching the food containing chamber 50. An electrical insulator 22 is bonded to the water tray 20 to prevent sparking between the water tray 20 and the base container 30 that may otherwise be induced by microwave radiation. Vent openings 23 for admitting steam from steam generating chamber 40 to food containing chamber 50 have a size and number selected to provide optimum microwave shielding and free flow of steam to reach the food inside the food containing chamber 50. The container base 30 is made of the same microwave shielding material as the water tray 20 such as to block microwaves from reaching the food containing chamber 50. This embodiment enables food 60 inside the cooking chamber 50 to be cooked by steam without exposing the food to microwave radiation.

Figure 3:
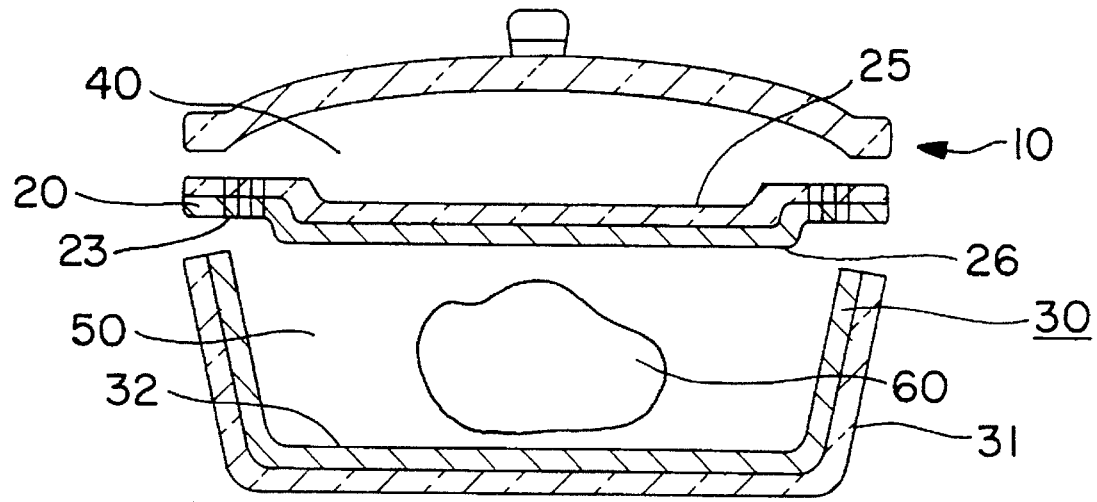
FIG. 3 is a sectional view of a second embodiment of the invention.
Figure 4:
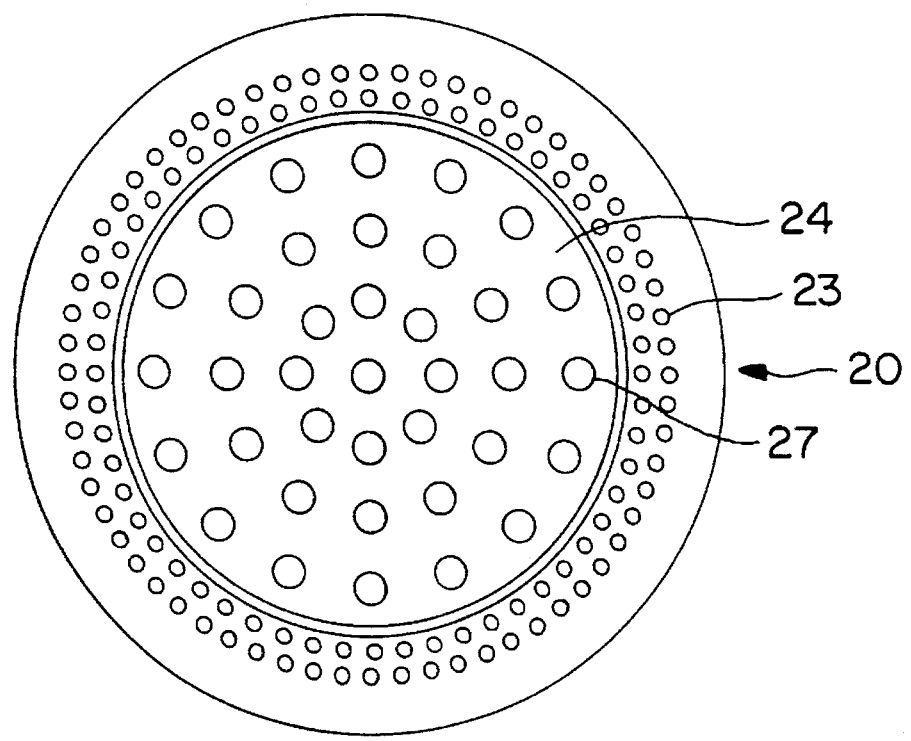
FIG. 4 is a plan view of the water tray shown in FIG. 3.
Figure 5:
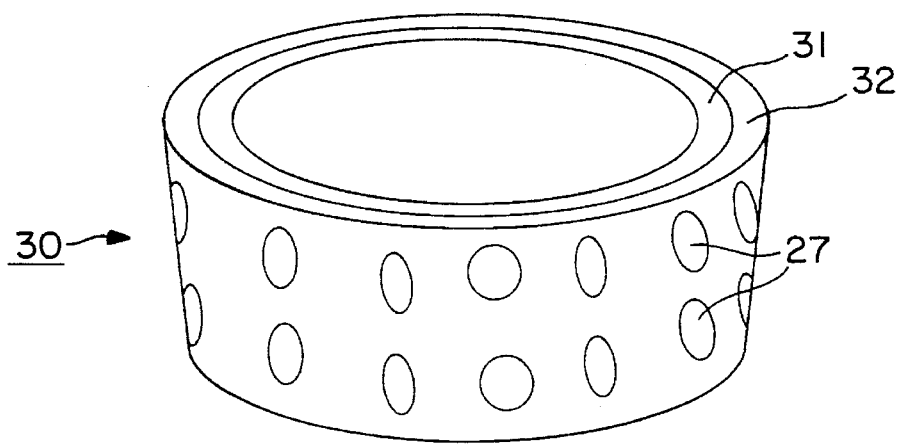
FIG. 5 shows the apertures of the base container shown in FIG. 3.

FIG. 3 shows another embodiment which is capable of cooking the food with steam and a controlled amount of microwave energy. The water tray 20 or the container base 30 or both are constructed to allow a controlled amount of microwave energy to reach the food 60 inside the cooking chamber 50 when water tray 20 with top cover 10 encloses the steam chamber 40 within the steam cooking vessel. Both the water tray 20 and the container base 30 are made of two layers. The upper layer 24 of the water tray 20 and outside layer 31 of the container base 30 are constructed from ceramic, glass or plastic to permit transmission of microwave energy. The lower layer 23 of the water tray 20 and inside layer 32 of container base 30 are formed of microwave blocking material which may be a ferrite enamelled or otherwise bonded to the microwave transmitting layer. The microwave shielding layers have open areas 27 which are therefore microwave transmitting areas as shown in FIG. 4 to allow partial transmission of microwave energy to reach the food 60 inside the cooking chamber 50. Similarly, as shown in FIG. 5, the floor and the wall of the container base 30 may be constructed with microwave transmitting areas 27 in the microwave shielding area 32 that admit microwave energy into the chamber 50. The intensity of microwave energy to reach food 60 inside cooking chamber 50 is controlled by the number and size of the microwave transmitting areas 27 in the microwave shielding material.

In a variation of the embodiment of FIG. 3 (not shown), the microwave blocking layer and the transmitting layer of water tray 20 and container base 30 may be interchanged.

Figure 6:
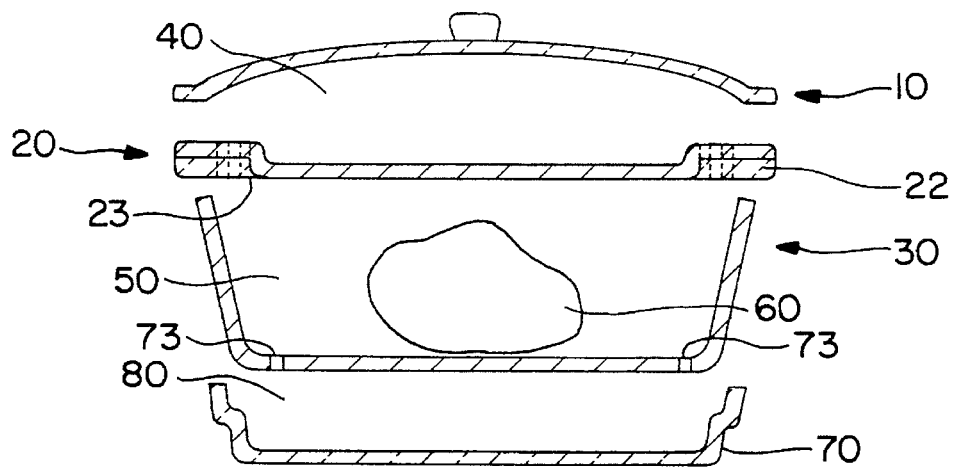
FIG. 6 shows addition of a bottom water tray.
Figure 7:
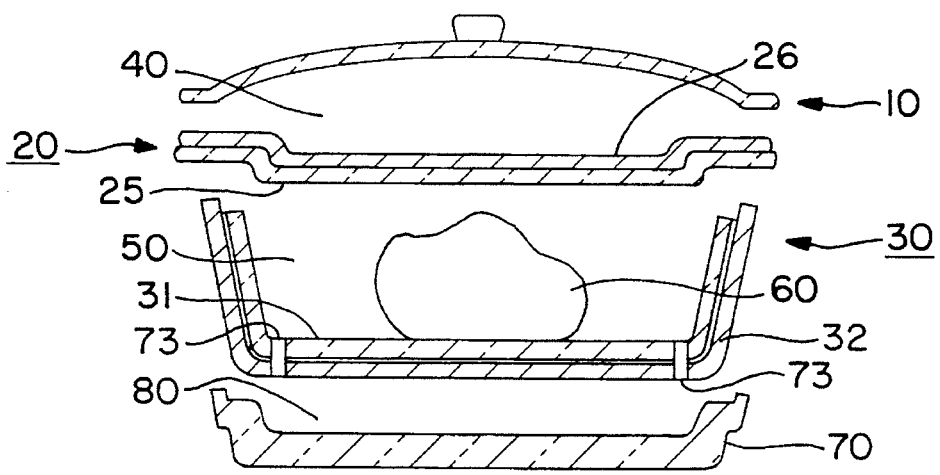
FIG. 7 shows addition of a bottom water tray with double wall construction.
Figure 8:
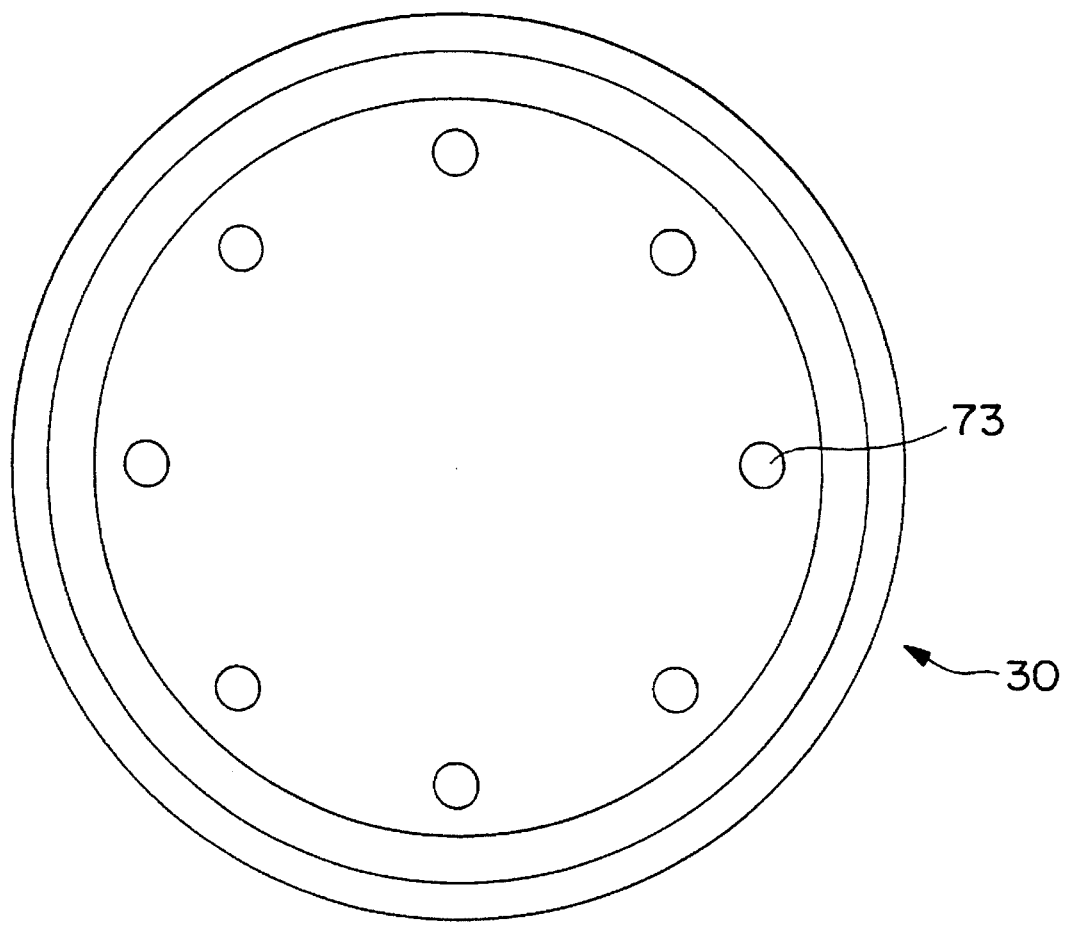
FIG. 8 is the plan view showing an aperture array in the container base of FIGS. 6 and 7.

FIGS. 6 and 7 show another embodiment including another water tray 70 under the base container 30 thereby forming an additional steam generating chamber 80. FIG. 8 shows, to best advantage, an array of vent openings 73 in the bottom surface of base container 30 to allow steam to enter the food containing chamber 50 from the lower steam generating chamber 80. This embodiment retains all of the advantages for cooking of the embodiments of FIGS. 1 and 3 and additionally allows steam generated in the lower steam generating chamber 80 to circulate into food containing chamber 60. This feature further ensures uniform cooking temperature and steam distribution.

In addition to showing the bottom water tray, FIG. 7 also shows the dual layer construction of FIG. 3 but in which the microwave shielding layers 24 and 31 of the water tray 20 and the container base 30 respectively are interchanged with the microwave transmissive layers 23 and 32 respectively to achieve the same effect of admitting a reduced amount of microwave energy to the cooking area. With these embodiments, an optimized amount of microwave energy reaches food 60 inside food containing chamber 50, combining with steam heat to produce an ideal cooking environment.

Figure 9:
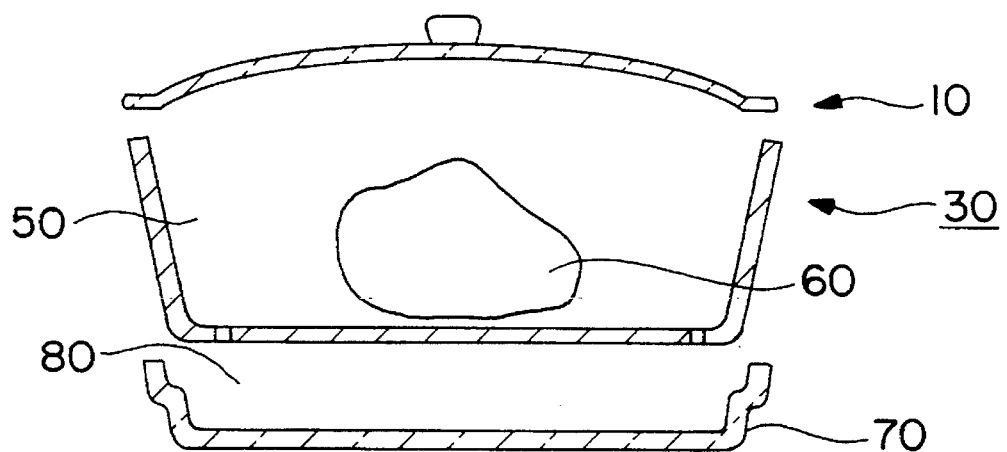
FIG. 9 shows the embodiment of FIGS. 6 and 7 without the upper water tray.

FIG. 9 shows the water tray 70 under container base 30 but without upper water tray 20.

Figure 10:
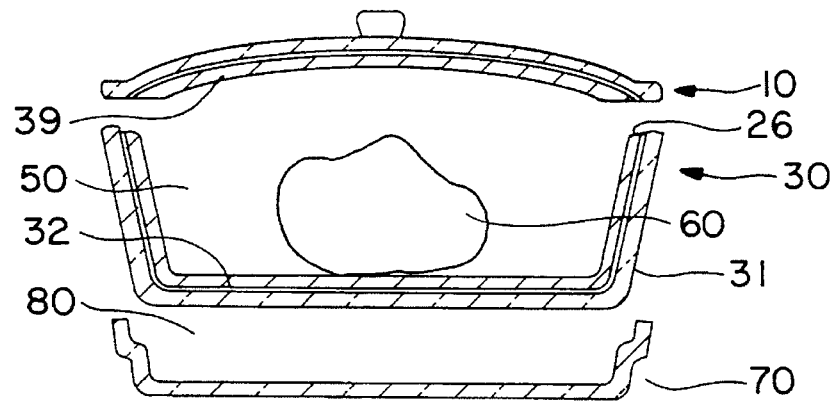
FIG. 10 shows the embodiment of FIG. 9 in which the microwave shield forming the food container chamber is microwave transmitting material laminated to microwave shielding material.

FIG. 10 shows the arrangement of FIG. 9 but with the microwave shielding layers 32 and 39 bonded to the base container 30 and cover 10 respectively.

Figure 11:
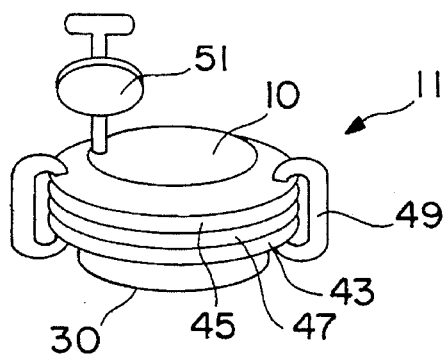
FIG. 11 is a perspective view of the invention showing a valve for controlling pressure.

FIG. 11 is a perspective view showing the assembled cooking vesssel 11 with base container 30 having a lip 43, cover 10 having a lip 45, and water tray 20 having a lip 47 all clamped together by clamps 49. A pressure control valve 51 (well known in the art of pressure cookers) is mounted on cover 10 and communicates with the inside of vessel 11 so that the steam pressure inside vessel 11 is controllable.

The foregoing examples illustrate a major feature of the invention which is generally a vessel with a food containing chamber and a water containing chamber separated by a divider. Shape and materials for construction of the vessel including the divider are such that when the vessel is exposed to microwave radiation, the food is shielded from the microwaves and the water is heated to steam by the microwaves. Steam from the water containing chamber passes through vent openings to the food containing chamber so that the food is cooked by steam heat rather than microwave irradiation. A variation of this feature is the vessel being constructed such that a limited amount of microwave energy in addition to the steam heat is used to cook the food.

Figure 12:
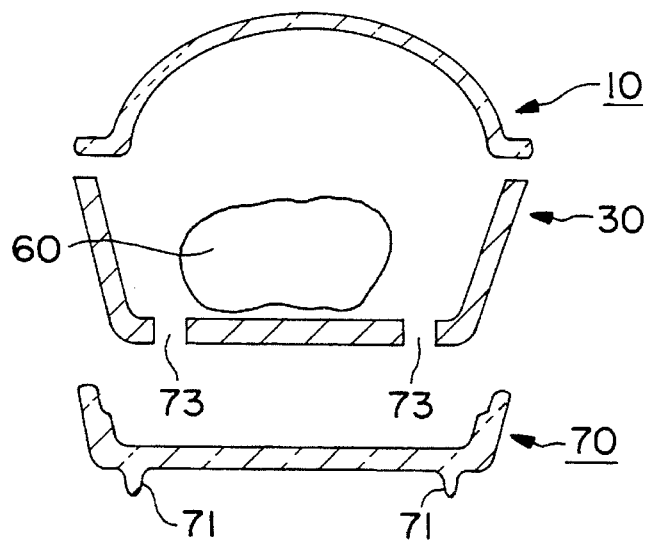
FIG. 12 shows an embodiment with microwave absorbing material.

Other variations and modifications may be perceived by the reader after reading the specification and studying the drawings which are within the scope of the invention. For example, FIG. 12 shows a water tray 70 made of microwave absorbing material such as a copper alloy having a resistivity in the range of 10 micro ohms and faving legs 71 and a food containing chamber 30 made of microwave shielding material and having vent holes 73 that communicate with the water tray 70.

In view of these and other similar variations, I therefore wish to define the scope of my invention by the appended claims and in view of the specification if need be.

I claim:

1. A vessel for cooking food which comprises:

a housing enclosing a first chamber and a second chamber;

said first and second chambers separated from one another by a divider;

said first chamber adapted for holding food;

said second chamber adapted for holding water;

said first chamber including first wall sections having a shape and constructed at least partially from microwave shielding material, said shape and said microwave shielding material operably selected in combination with one another such that when said vessel is exposed to microwave radiation, said food in said first chamber is substantially shielded from said microwave radiation;

said microwave shielding material having a sufficiently small electrical conductivity and sufficiently large magnetic permeability to reflect microwaves without being heated by microwaves;

said second chamber including second wall sections constructed at least partially from at least one of microwave:
   (i) transmitting material;
   (ii) absorbing material and having a shape, said at least one of microwave transmitting material and absorbing material operably selected in combination with said shape such that when said vessel is exposed to microwave radiation, said water in said second chamber absorbs said microwave radiation whereby a portion of said water is converted to steam;

said microwave transmitting material having a sufficiently small electrical conductivity and small magnetic permeability such that said transmitting material is sufficiently transparent to microwaves such that said microwave energy is transmitted through said transmitting material without substantially heating said transmitting material;

said microwave absorbing material having an electrical conductivity that is sufficiently large and a permeability that is sufficiently low such that said absorbing material is substantially heated by said microwave energy;

said first chamber communicating with said second chamber through vent openings in one of said housing and divider such that said food is cooked by exposure to said steam passing from said second chamber into said first chamber when steam is generated by microwaves exposed to water in said second chamber.

2. The vessel of claim 1 wherein said housing comprises:

a top cover;

a base container; and said divider being a water tray removably located between said top cover and said base container such that said water tray positioned on a top opening in said base container forms said first chamber for holding food and said top cover is positionable over said water tray to form said second chamber containing water;

said water tray having a plurality of vent openings arranged such as to enable steam generated in said second chamber to pass into said first chamber;

said top cover being constructed at least partially from a microwave transmitting material and said base container and said water tray being constructed at least partially from microwave-shielding material such as to prevent food in said container base from absorbing microwave energy.

3. The vessel of claim 2 wherein at least one of said base container and water tray has a first area constructed of microwave transmitting material such as to permit entry of microwave radiation into said first chamber such that when said vessel is exposed to microwave radiation, said food in said first chamber is partially shielded from said microwave radiation and is cooked by a combination of exposure to said steam and said microwave radiation.

4. The vessel of claim 3 wherein said top cover has a second area constructed from microwave shielding material and has a shape adapted for moderating entry of microwaves into said device.

5. The vessel of claim 2 which comprises:

another water tray;

said container base positionable on said another water tray such as to form a third chamber adapted for holding water;

said base container having vent openings such as to permit said first chamber to communicate with said third chamber whereby steam generated in said third chamber passes into said first chamber whereby food in said first chamber is cooked by exposure to steam.

6. The vessel of claim 5 wherein said another water tray is constructed from microwave transmitting material.

7. The vessel of claim 6 wherein said another tray has first areas constructed from microwave shielding material and second areas constructed from microwave transmitting materials adapted to modify entry of microwaves into said vessel.

8. The vessel of claim 2 wherein said base container and water tray are constructed from a layer of a microwave shielding material laminated to one of a glass layer and a ceramic layer.

9. The vessel of claim 8 wherein said layer of microwave shielding material has openings such as to provide areas of one of said glass and ceramic through which microwave energy can pass and modify energy for cooking food.

10. The vessel of claim 1 which comprises:

said first and second chambers being airtight;

means for controlling pressure in said first and second chambers.

11. The vessel of claim 10 wherein said means for controlling pressure comprises a valve.

12. The vessel of claim 11 which comprises a pressure safety release valve.

13. The vessel of claim 1 wherein said microwave transmitting material is selected from the list of materials which consists of glass, electrically insulating ceramic and plastic.

14. The vessel of claim 1 wherein said microwave-shielding material is selected from a group which consists of a metal and electrically conducting ceramic.

15. The vessel of claim 1 wherein said microwave shielding material is selected from a group of materials that consists of a metal and a ferrite.

16. The vessel of claim 15 wherein said microwave shielding material has a resistivity greater than 80 microohms/cm and a permeability greater than 250 $U_o$.

17. The vessel of claim 1 wherein said microwave transmitting material is selected from a group of materials that includes a glass, ceramic and a plastic.

18. The vessel of claim 1 wherein said microwave transmitting material has a resistivity greater than $10^3$ ohms/cm and a permeability less than 5 $U_o$.

19. The vessel of claim 1 wherein said microwave shielding material is a ferrite.

20. The vessel of claim 1 wherein said microwave shielding material is a ferrite layer bonded to one of a ceramic, glass and plastic.

21. A method for cooking food which includes the steps:
   (a) providing a vessel which comprises:
      (i) a housing enclosing a first chamber and a second chamber;
      (ii) said first and second chambers separated from one another by a divider;
      (iii) said first chamber adapted for holding food;
      (iv) said second chamber adapted for holding water;
      (v) said housing and divider being constructed of wall sections from microwave reflecting material having a sufficiently small electrical conductivity and sufficiently large magnetic permeability to reflect microwaves without being heated by microwaves and microwave absorbing material having an electrical conductivity that is sufficiently large and a permeability that is sufficiently low such that said absorbing material is substantially heated by said microwave energy and having a shape operably selected in combination with said absorbing and reflecting material such that when said vessel is exposed to microwave radiation, said food in said first chamber is shielded from said microwave radiation and said water in said second chamber absorbs said microwave radiation whereby a portion of said water is converted to steam;
      (vi) said fast chamber communicating with said second chamber through vent openings in one of said housing and divider such that said food is cooked by exposure to said steam passing from said second chamber into said first chamber;
   (b) placing food in said first chamber;
   (c) placing water in said second chamber;
   (d) placing said vessel in a microwave oven;
   (e) irradiating said vessel with microwaves.

22. The method of claim 21 wherein said housing comprises a top cover, a container base and said divider is a water tray removably located between said top cover and said base container such that when said base container is positioned to hold food, with said water tray holding water placed over a top opening in said base container, said top cover is positionable over said water tray to form said second chamber containing water; said water tray having a plurality of vent openings arranged such as to enable stem generated in said second chamber to pass into said first chamber and said top cover being constructed from a microwave transparent material having an electrical conductivity and magnetic permeability sufficiently small to be substantially transparent to microwaves and said base container and said water tray being constructed from said microwave-shielding material selected such as to prevent food in said container base from absorbing microwave energy, and step (a) includes the step:

placing food in said base container; and step (b) includes the step;

placing water in said water tray.

* * * * *